(12) United States Patent
Tateyama

(10) Patent No.: US 6,354,192 B2
(45) Date of Patent: Mar. 12, 2002

(54) FRYER

(75) Inventor: Iwao Tateyama, Nagoya (JP)

(73) Assignee: Paloma Industries, Limited (JP)

( * ) Notice: Subject to any disclaimer, the term of this patent is extended or adjusted under 35 U.S.C. 154(b) by 0 days.

(21) Appl. No.: 09/864,893

(22) Filed: May 24, 2001

(30) Foreign Application Priority Data

Jun. 20, 2000 (JP) .......................................... 12-185288

(51) Int. Cl.$^7$ .......................... A47J 37/00; A47J 37/12; F23C 11/04
(52) U.S. Cl. ............................. 99/330; 99/331; 99/344; 99/403; 126/391; 210/167; 210/DIG. 8; 431/1
(58) Field of Search .......................... 99/326–333, 344, 99/403–408; 126/390, 391; 431/1; 122/24; 210/167, DIG. 8

(56) References Cited

U.S. PATENT DOCUMENTS

| | | | |
|---|---|---|---|
| 4,228,730 A | * 10/1980 | Schindler et al. | 99/407 |
| 4,372,980 A | * 2/1983 | Luebke et al. | 426/231 |
| 4,437,159 A | 3/1984 | Waugh | 364/400 |
| 4,639,213 A | * 1/1987 | Simpson | 431/326 |
| 4,660,542 A | * 4/1987 | Scherer | 99/403 |
| 4,663,710 A | 5/1987 | Waugh et al. | 364/400 |
| 4,672,540 A | 6/1987 | Waugh et al. | 364/400 |
| 4,684,412 A | * 8/1987 | Fritzsche | 99/330 X |
| 4,848,318 A | * 7/1989 | Brewer | 126/390 |
| 4,858,119 A | 8/1989 | Waugh et al. | 364/400 |
| 4,913,041 A | * 4/1990 | Taber et al. | 126/391 |
| 5,038,753 A | * 8/1991 | Yokoyama et al. | 99/403 X |
| 5,185,168 A | * 2/1993 | Takahashi | 426/438 X |
| 5,261,322 A | * 11/1993 | Yokoyama et al. | 99/403 X |
| 5,417,202 A | * 5/1995 | Cote | 99/403 X |
| 5,490,449 A | * 2/1996 | Meister et al. | 99/403 |
| 5,706,717 A | * 1/1998 | Barner | 99/330 |

* cited by examiner

Primary Examiner—Timothy F. Simone
(74) Attorney, Agent, or Firm—Pearson & Pearson, LLP

(57) ABSTRACT

A discrepancy in the model setting between controllers is definitely detected.

When it is judged at S4 that the setting is a split vat model, the procedure then goes to S5 for determining the cooking menu at the right oil vat, S6 for processing data to be transmitted to a burner controller, and S7 for processing data received from the burner controller. When it is judged at S8 that the setting of the burner controller is a full vat model because the temperature of a thermistor at the right oil vat received from the burner controller is an $FFFF_H$ level (equivalent to 3609° C.), the discrepancy in the setting is displayed for notification at S9. Then, the burner controller is instructed at S10 for extinction.

4 Claims, 5 Drawing Sheets

FRYER

BACKGROUND OF THE INVENTION

1. Field of the Invention

The present invention relates to a fryer for heating oil vats with heating means to fry food.

2. Description of the Related Art

A fryer has oil vats and heating means, such as pulse burners, for heating up a cooking oil (referred to as an oil hereinafter) contained in the oil vats. The oil vats are classified into single vat model (referred to as a full vat hereinafter) and split vat model (referring to as a split vat hereinafter). The split vat model of the fryer has a heating means and a temperature sensor provided in each vat.

The fryer also includes a controller unit which comprises an operational display for operation and display of temperature settings and cooking menus, a first controller (referred to as a fry controller hereinafter) for determining the temperature setting and duration of cooking in accordance with a cooking menu, and a second controller (referred to as a burner controller hereinafter) for controlling the action of the heating means according to a detected temperature by the temperature sensor so as to maintain the temperature of oil to a setting level.

The fry controller and the burner controller are communicated to each other by data exchange in the serial communication type which employs less transmission lines than the parallel communication type and will hence be minimized in the overall construction. However, for operating in the serial communication type, both the fry controller and the burner controller are set in either the full vat model or split vat model. As the two controllers are also connected by the same communication cables, their model setting can be different, for example, the fry controller set in a full vat model can be connected to the burner controller set in a split vat model. This will result in a detection error such as thermistor disconnection or combustion failure, permitting no action of the heating means. Also, the discrepancy in the model setting can hardly be notified and its measure will be retarded.

SUMMARY OF THE INVENTION

It is an object of the present invention, as defined in claim 1, to provide a fryer which can readily detect a discrepancy in the model setting for the full vat model or the split vat model between the two controllers while its simple arrangement for a serial communication type remains unchanged.

For achievement of the above object, the fryer according to claim 1 of the present invention is arranged wherein data of the model setting is transferred from one to the other between the first and second controllers at the start-up of controlling the heating means and when a discrepancy in the model setting between the two controllers is found, the other controller received the data gives an alarm.

As defined in claim 2, the fryer according to claim 1 is modified wherein when the discrepancy in the model setting is found, the action of the heating means is inhibited.

As defined in claim 3, the fryer according to claim 1 or 2 is modified wherein the data of the model setting consists of temperature measurements of the temperature sensors determined by the second controller and when one single oil vat is used, the temperature measurement from the other unused oil vat is set to an impossible level and transferred from the second controller to the first controller so that the first controller acknowledges the model setting of the second controller.

DETAILED DESCRIPTION OF THE PREFERRED EMBODIMENT

One embodiment of the present invention will be described in more detail referring to the accompanying drawings.

Figure 1:
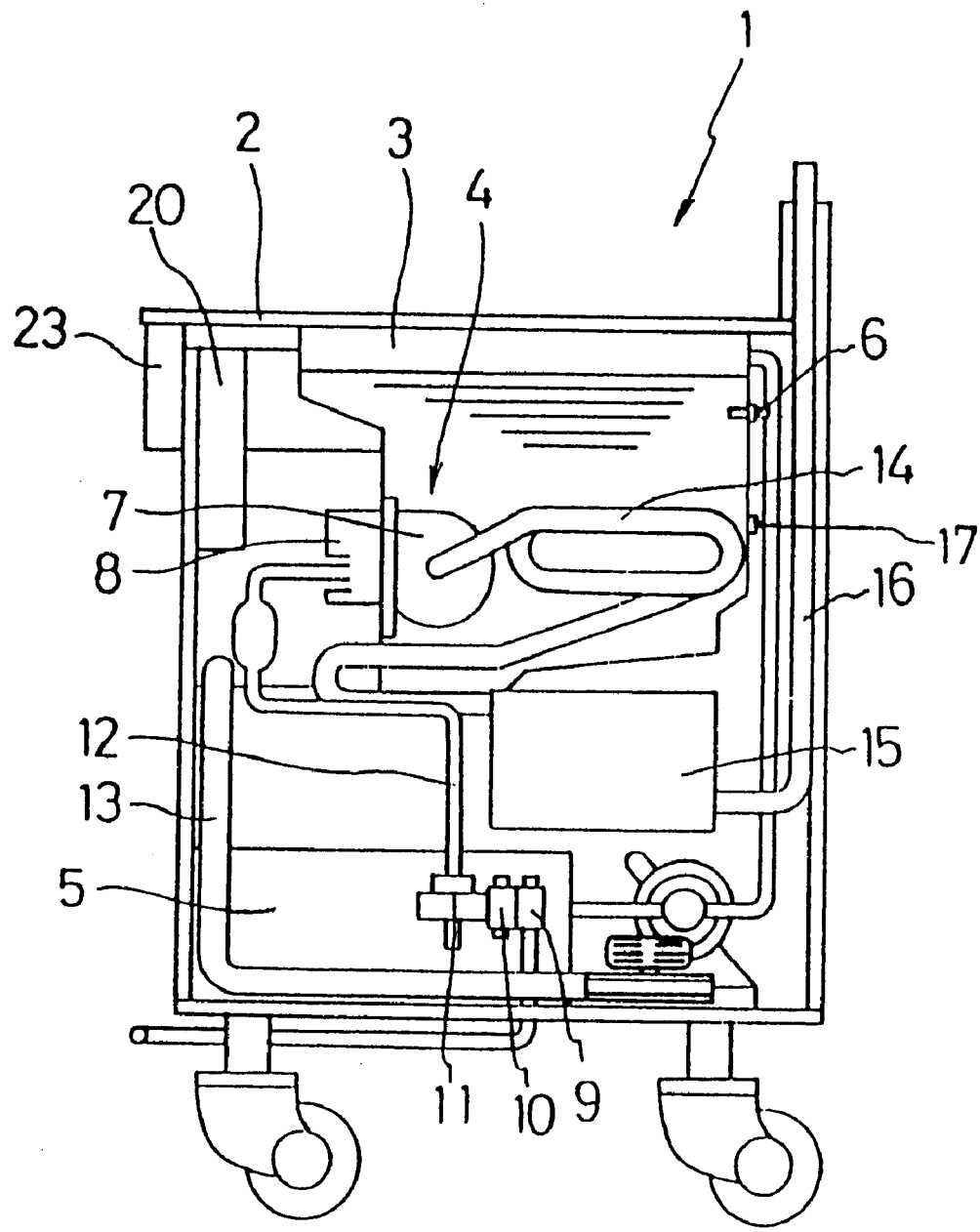
FIG. 1 is a schematic overall view of a fryer.

FIG. 1 is a schematic overall view of a fryer. As shown, the fryer 1 comprises a pair of left and right oil vats 3, 3 provided in a casing 2 and filled with oil for frying foods (only one vat 3 shown in FIG. 1 as will be explained), a pulse burner 4 provided in the oil vat 3 as a heating means to heat the oil, and an oil tank 5 for temporally storing the oil to be filtered. Also, a thermistor 6 is provided as a temperature sensor in the oil vat 3 for measuring the temperature of the oil.

The pulse burner 4 consists mainly of a combustion chamber 7 located in the oil vat 3 and a mixing chamber 8 provided outside the oil vat 3 and communicated with the combustion chamber 7. The mixing chamber 8 is also connected with a gas conduit 12 which is in turn connected with, from the upstream side, an intake solenoid valve 9, a main solenoid valve 10, and a gas governor 11 for introduction of fuel gas. In addition, the mixing chamber 8 is connected with an air conduit 13 equipped with a fan for supplying air for combustion.

The combustion chamber 7 is communicated in the oil vat 3 with a tail pipe 14 which is connected by a decoupler 15 outside the oil vat 3 to an exhaust conduit 16 opened to the outside of the fryer 1. Denoted by 17 is a high-limit switch which incorporates a bimetal thermostat and is mounted on the exterior surface of the oil vat 3 for switching ON and OFF in response to the surface temperature of the oil vat 3.

Figure 2:
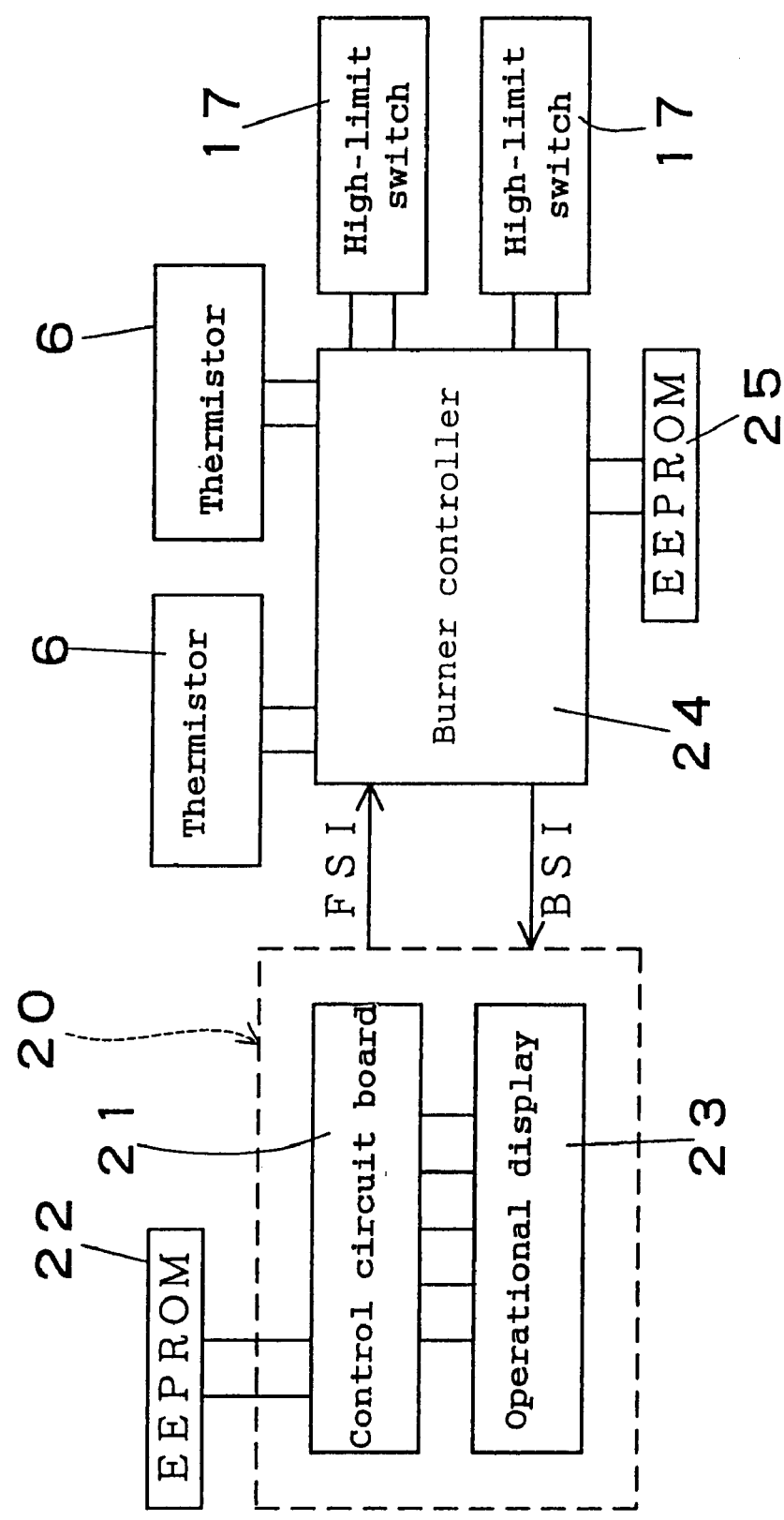
FIG. 2 is a block diagram of a controller unit of the fryer.

FIG. 2 is a block diagram of a control unit of the fryer 1. Denoted by 20 is a first controller (referred to as a fry controller hereinafter) which includes a control circuit board 21 carrying thereon known components including a CPU (central processing unit), ROM devices, and an interface for transmission and reception of data. The control circuit board 21 is connected at input side with an EEPROM 22 for storage of control data and setting data of both the full and split vat models. The fry controller 20 also includes an operational display 23 mounted on the front of the casing 2 as exposed for allowing the temperature setting and the selection of a cooking menu by means of the switching action and displaying the temperature and the selected menu.

A second controller 24 is also provided (referred to as a burner controller hereinafter), similar to the fry controller 20, having a CPU and ROM devices and connected with an EEPROM 25 for storage of setting data of both the full and split vat models. The burner controller 24 is connected at input side with a pair of thermistors 6 for the corresponding oil vats 3 and a pair of high-limit switches 17.

Figure 3:
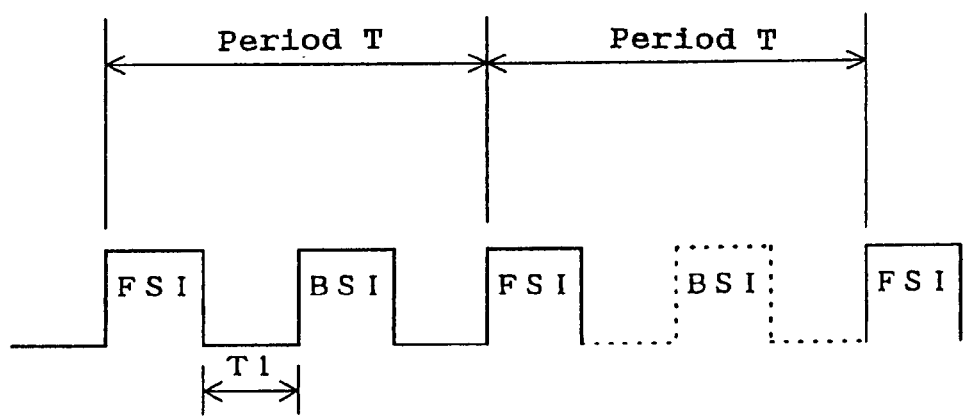
FIG. 3 is a timing chart showing a communication type between a fry controller and a burner controller.

The fry controller 20 and the burner controller 24 are connected to each other in a serial communication type for exchange of data over a polling control system. More specifically, the fry controller 20 releases its setting information signal (referred to as an FSI signal hereinafter), such as ON and OFF operating data, set point temperatures, or ON and OFF high limit test data, at the initial stage of a polling period T shown in FIG. 3 for demanding a response of the burner controller 24. Upon receiving the signal from the fry controller 20, the burner controller 24 transmits its operating data signal (referred to as BSI signal hereinafter), such as temperature measurements of the thermistors 6 or error detection codes, after a duration of a period T1. The transmission of the FSI signal at intervals of the period T1 from the fry controller 20 is executed regardless of the reception of the BSI signal from the burner controller 24. Especially, the burner controller 24 releases the BSI signal only when receiving the FSI signal from the fry controller 20.

As the fry controller 20 and the burner controller 24 are predetermined of the model for assigning the oil vats 3 as a full vat or as a pair of split vats like this embodiment, their model setting is regularly examined prior to the start-up of the pulse burner 4 to identify any error combination. This examination of the model setting will now be explained referring to the flowcharts of FIGS. 4 and 5.

Figure 4:
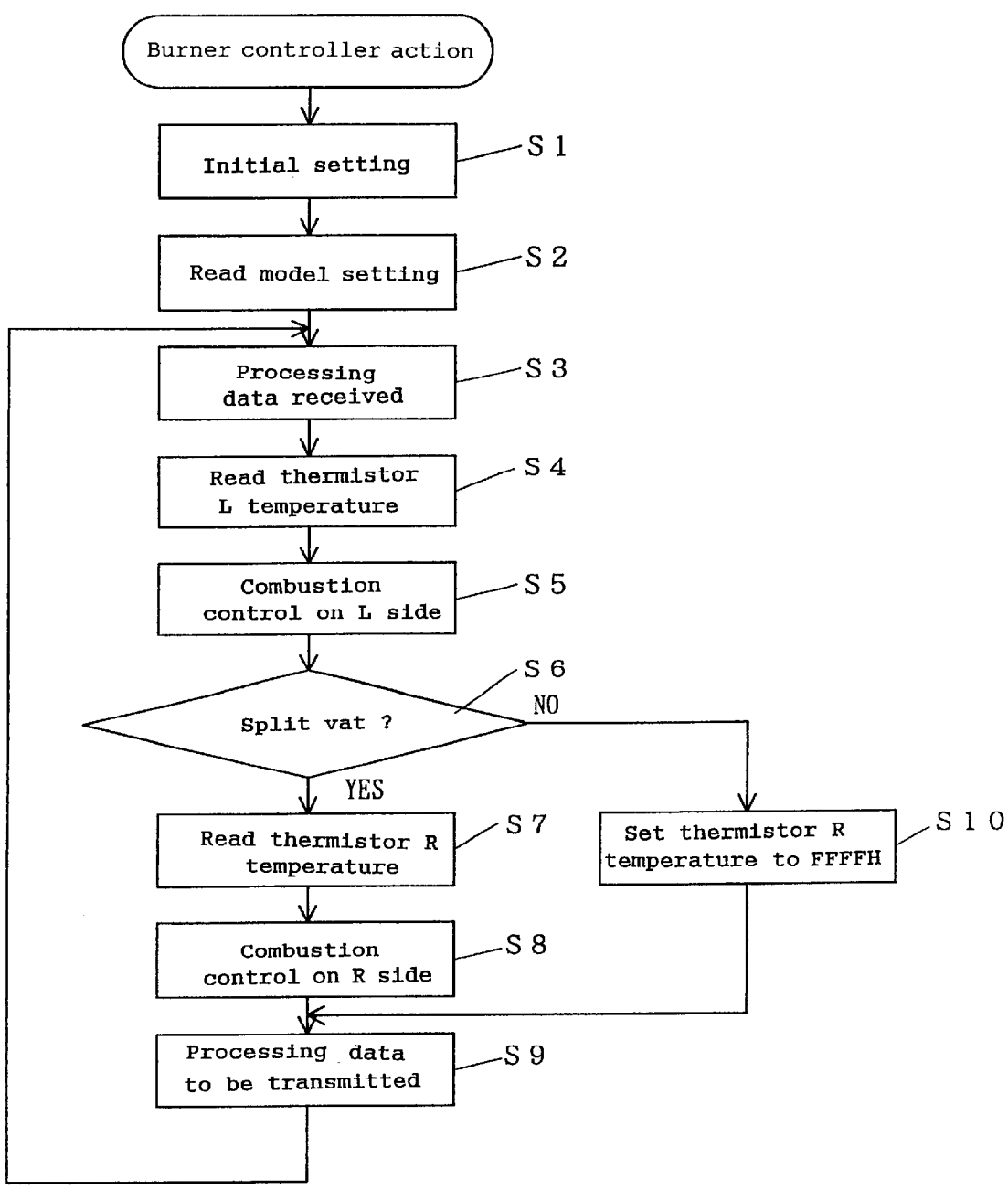
FIG. 4 is a flowchart of controlling action of the burner controller.

FIG. 4 is the flowchart of a controlling action of the burner controller. As the initial setting has been made at S1, the setting of either full vat model or split vat model is read at S2. This is followed by processing data of the FSI signal like the set point temperature from the fry controller 20 at S3, reading temperature of the thermistor 6 in the left oil vat 3 at S4 (denoted as "thermistor L temperature" in the flowchart), and performing at S5 opening and closing actions of the main solenoid valve 10 in the pulse burner 4 at the left oil vat 3 (denoted as "on L side" in the flowchart) to burn the gas and extinguish the combustion for maintaining the temperature of oil in the oil vat 3 to a desired level (generally, 93° C. to 182° C.) determined by the fry controller 20. The description is only made with the left oil vat 3 because the full vat model is adapted for controlling the left vat. The same is applied to the fry controller 20.

It is then examined at S6 whether the setting model is the split vat or not. When the setting model is the split vat, the temperature of the thermistor 6 at the right oil vat 3 at S7 (denoted as "thermistor R temperature" in the flowchart) and the pulse burner 4 at the right oil vat 3 (denoted as "on R side" in the flowchart) is controlled in the combustion to maintain the oil temperature to a setting level determined by the fry controller 20. This is followed by processing data such as the thermistor temperature for transmission to the fry controller 20 at S9 and repeating the process of another data from the fry controller 20 at S3 and after.

When it is judged at S6 that the setting model is not the split vat but the full vat, the procedure goes to S10 where the temperature of the thermistor 6 at the right oil vat 3 is set to an $FFFF_H$ level. This level is equal to 3609° C. or an impossible degree for the right thermistor which is not in use. Therefore when the burner controller 24 is the full vat model, the temperature data of said level is transmitted at S9 to the fry controller 20.

Figure 5:
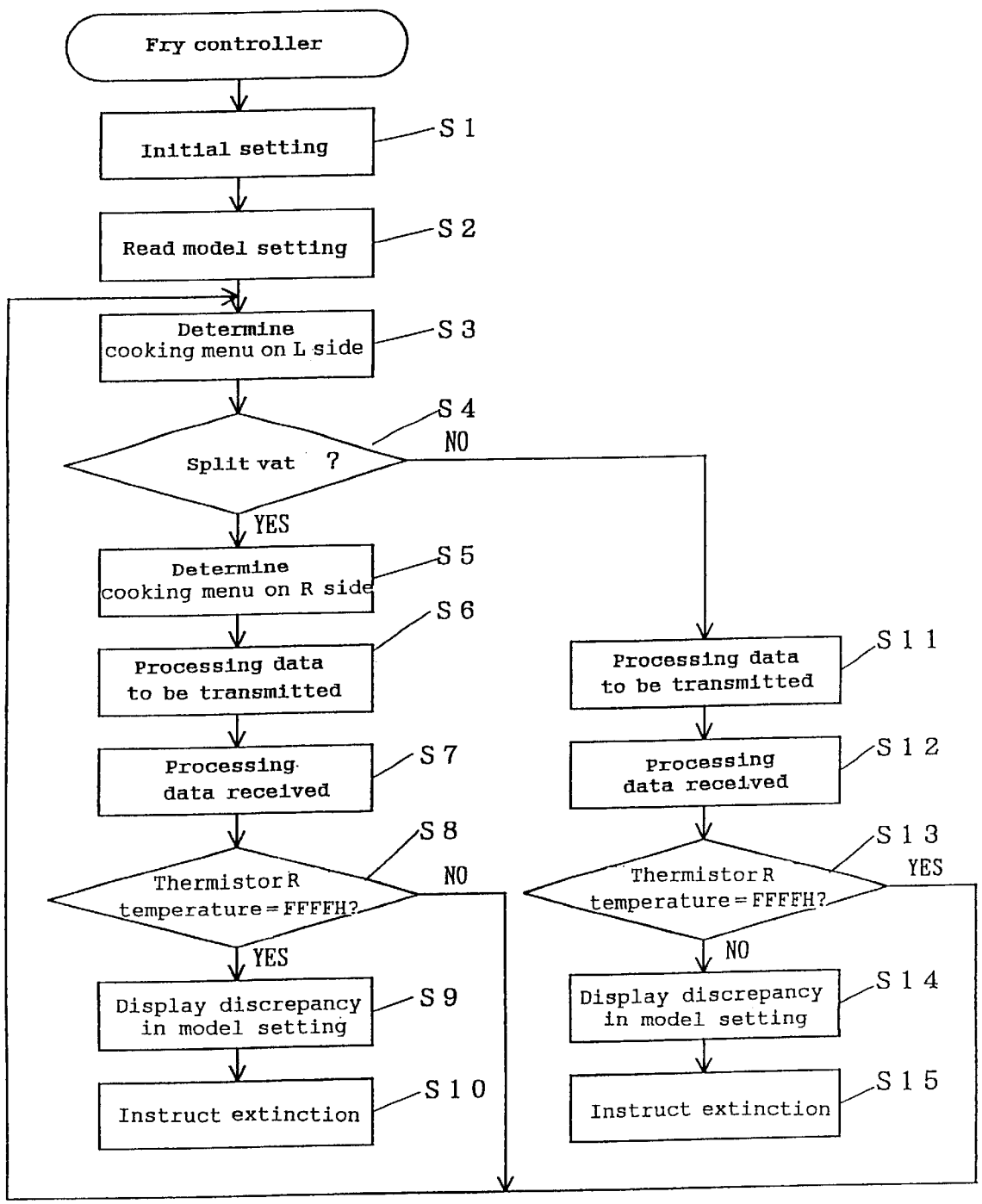
FIG. 5 is a flowchart of controlling action of the fry controller.

FIG. 5 is the flowchart of a controlling action of the fry controller 20. After the initial setting is completed at S1 similar to that of the burner controller 24, the model setting of either the full or split vat is read at S2 and the cooking menu for the left oil vat 3 is determined through operating the operational display 23 at S3. This is followed by, when it is judged at S4 that the setting is the split vat model, determining the cooking menu for the right oil vat 3 at S5, processing data for transmission to the burner controller 24 at S6, and processing data received from the burner controller 24 at S7. When it is judged at S8 that the thermistor temperature at the right oil vat 3 received from the burner controller 24 is the $FFFF_H$ level, the burner controller 24 is indicated by the full vat model which is different from its original setting of the split vat model. Hence, an alarm for the wrong combination is given at S9 by displaying on the operational display 23. At S10, an instruction for extinction is then transferred to the burner controller 24. If it is judged at S8 that the thermistor R temperature is not the $FFFF_H$ level, the setting of the burner controller 24 which is the split vat model is in agreement with that of the fry controller 20 and the procedure is repeated from S3.

When it is judged at S4 that the setting is not the split vat model but the full vat model, the procedure goes to S11 for data processing for transmission, S12 for processing received data, and S13 for examining whether the temperature of the right thermistor 6 is the $FFFF_H$ level or not. When not, the burner controller 24 is the split vat model which is different from the full vat model of the fry controller 20. Then, an alarm for the wrong combination is given at S14 by displaying on the operational display 23. At S15, an instruction for extinction is then transferred to the burner controller 24. If it is judged at S13 that the thermistor R temperature is the $FFFF_H$ level, the setting of the burner controller 24 which is the full vat model is in agreement with that of the fry controller 20 and the procedure is repeated from S3.

As set forth above, the fry controller 20 receives data of the thermistor R temperature as the model setting data from the burner controller 24 at the start-up of operating the pulse burner 4 and when the setting is different between the fry controller 20 and the burner controller 24, gives an alarm. This permits the discrepancy in the model setting to be swiftly corrected, thus improving the convenience of the fryer 1.

It is also arranged that, upon the discrepancy in the model setting being detected, the action of the pulse burner 4 is instantly stopped. Accordingly, no operation of the fryer 1 with the discrepancy will be permitted.

As the temperature of the thermistor 6 supplied from the burner controller 24 is regarded as data of the model setting, its measurement of the right thermistor of the right oil vat 3 which is not used in the full vat model is expressed by an impossible level. The temperature measurement of the thermistor 6 enables to be transferred as the data, thus allowing the model setting to be examined easily and rationally.

While the above description is based on the split vat model, a combination between the model setting of the fry controller and that of the burner controller can be examined in the full vat model.

The model setting of either the full or split vat model is examined from the data of the thermistor R temperature transferred from the burner controller to the fry controller, however, it is not limited to the temperature measurement. Any other type of data for examining the model setting maybe employed with equal success. The burner controller can examine the model setting from data received from the fry controller.

As defined in claim 1 of the present invention, the fryer is arranged wherein data of the model setting is transferred from one to the other between the first and second controllers at the start-up of controlling the heating means and when a discrepancy in the model setting between the two controllers is found, the other controller gives an alarm. This allows the discrepancy in the model setting between the two controllers to be swiftly detected and corrected, hence contributing to the improvement in use of the fryer.

As defined in claim 2, the fryer according to claim 1 is modified wherein when the discrepancy in the model setting is found, the action of the heating means is inhibited hence avoiding any operation with the discrepancy between the two controllers.

As defined in claim 3, the fryer according to claim 1 or 2 is modified wherein the data of the model setting consists of temperature measurements of the temperature sensors determined by the second controller and when one single oil vat is used, the temperature measurement from the other unused oil vat is set to an impossible level and transferred from the second controller to the first controller so that the first controller acknowledges the model setting of the second controller. Accordingly, the model setting can be identified simply and rationally by utilizing the communication of detected temperature data.

What is claimed is:

1. A fryer comprising a first controller for determining temperature settings and/or cooking menus and a second controller connected in a serial communication type with the first controller for monitoring temperature measurements received from temperature sensors which measure the temperature of oil in oil vats and, in response to an instruction from the first controller, controlling the action of heating means provided in the oil vats, both the controllers arranged of which the model is determined corresponding to the use of the oil vats, either a single model or a left and right pair model, wherein data of the model setting is transferred from one to the other between the first and second controllers at the start-up of controlling the heating means and when a discrepancy in the model setting between the two controllers is found, the other controller received the data gives an alarm.

2. A fryer according to claim 1, wherein when the discrepancy in the model setting is found, the action of the heating means is inhibited.

3. A fryer according to claim 1, wherein the data of the model setting consists of temperature measurements of the temperature sensors determined by the second controller and when one single oil vat is used, the temperature measurement from the other unused oil vat is set to an impossible level and transferred from the second controller to the first controller so that the first controller acknowledges the model setting of the second controller.

4. A fryer according to claim 1, wherein the data of the model setting consists of temperature measurements of the temperature sensors determined by the second controller and when one single oil vat is used, the temperature measurement from the other unused oil vat is set to an impossible level and transferred from the second controller to the first controller so that the first controller acknowledges the model setting of the second controller.

* * * * *